O. L. GORDON.
SCALE.
APPLICATION FILED NOV. 25, 1912.

1,060,677.

Patented May 6, 1913.

Witnesses

Orin L. Gordon, Inventor by C. A. Snow & Co.
Attorneys

UNITED STATES PATENT OFFICE.

ORIN L. GORDON, OF ROBINSON, ILLINOIS.

SCALE.

1,060,677.  Specification of Letters Patent.  Patented May 6, 1913.

Application filed November 25, 1912. Serial No. 733,489.

*To all whom it may concern:*

Be it known that I, ORIN L. GORDON, a citizen of the United States, residing at Robinson, in the county of Crawford and State of Illinois, have invented a new and useful Scale, of which the following is a specification.

The present invention relates to improvements in scales, the particular structure hereinafter shown being a refinement or improvement of the scale shown in Patent No. 872,119 granted November 26, 1907, the primary object of the present invention being the provision of a scale in which the pan is carried by a spring elevated platform to which is connected the indicating dials, thus deviating from that shown in the above mentioned patent which shows the pan suspended or held from above.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
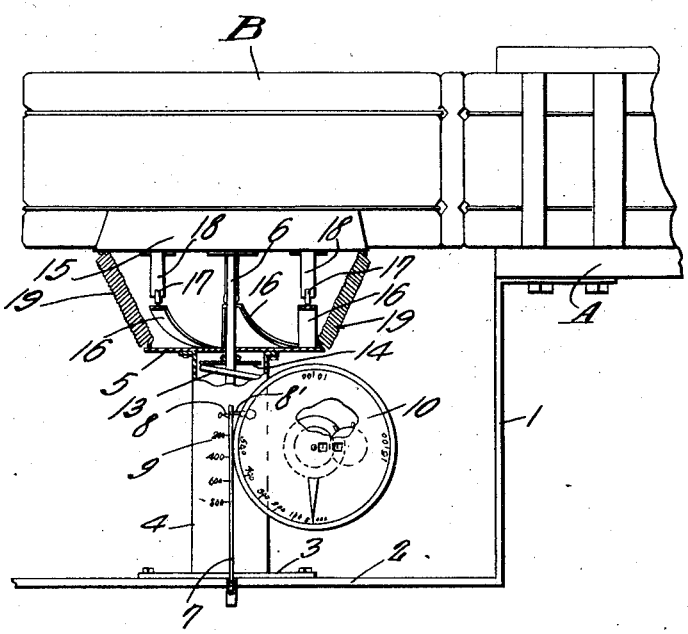
Figure 2:
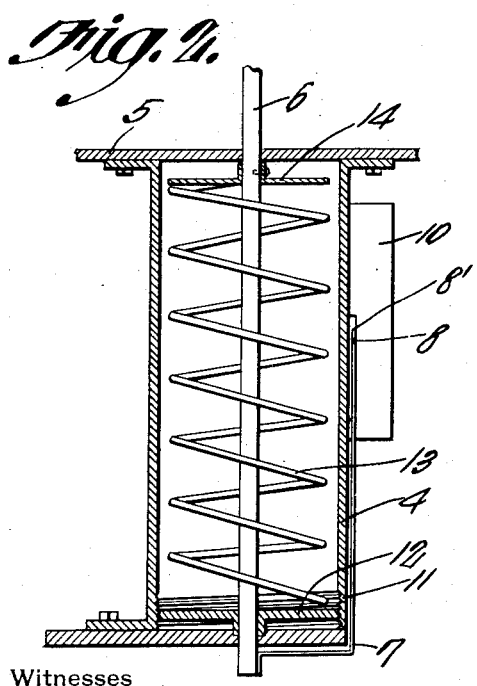
Figure 3:
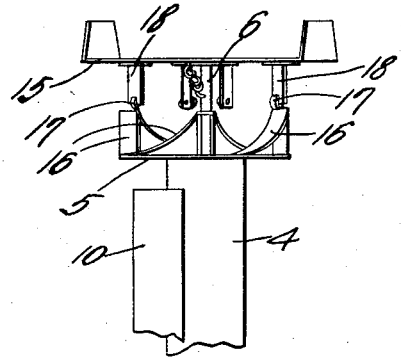

In the drawings, Figure 1 is a view in elevation of the weighing and registering scale in its operable relation to the discharge end of a baling press. Fig. 2 is a vertical central sectional view taken through the spring carried pedestal of the scale with the adjacent portion of the pan support and the cam carrying platform. Fig. 3 is a view illustrating the position of the pan when in weighing position.

Referring to the drawings, A designates the discharge end of a baling press, which carries the bracket 1 with the extension or platform 2 carried thereby and upon which is secured the base 3 of the pedestal 4 of the scales. A cam carrying platform 5 is fixedly connected to the upper end of the column or pedestal 4 and disposed for vertically sliding movement concentrically of the pedestal or column 4 is the pan carrying post 6 which has attached to its lower end the right angled bracket 7 whose free end is the indicating end for the scales, disposed to coact with the graduated scale 9 formed upon the outer surface of the column 4. A casing 10 is carried by the column 4 and contains the registering mechanism as shown in the above mentioned patent, and the detail of which is not referred to herein.

Disposed within the threaded end 11 of the column 4 is a disk 12, which receives the lower end of the helical spring 13, whose upper end is against the disk 14 fixedly connected to the post 6 and normally holding said post 6 in elevated position and the pan 15 when occupied in its highest or zero position.

Fixedly mounted upon the fixed platform 5 are the cam tracks 16, which correspond to the cam tracks shown in the above mentioned patent and have in engagement therewith the rollers 17 carried by the standards or posts 18 depending from the lower side of the weighing pan 15.

Disposed within the pan 5 and in order to illustrate the invention as shown in Fig. 1, is the bale B just received from the discharge end of the baling press A, and as set forth in the before mentioned patent, in order to weigh this bale, the pan is rotated so that the rollers 17 descend upon the inclines of the cams 16 and thus throw the weight of the bale B upon the post 6, which is depressed against the action of the spring so that the pointer 8 will indicate the weight of the bale while the arm 8' carried by the pointer will operate the registering device 10 to indicate the combined weight of the bales, thus weighed and the combined weight as set forth with the mechanism as shown in the before mentioned patent.

From the foregoing description, it is evident that in a scale constructed according to the present invention, the suspending bracket as shown in the before mentioned patent is dispensed with, and the complete weighing and indicating mechanism is disposed below the pan 15 and can be readily placed in position at the discharge end of the baling chamber, the operation of the pan and cam devices being similar to that shown in the before mentioned patent, this particular structure being a refinement or improvement thereupon. The springs 19 are employed and act in a similar manner to the springs 31 of the before mentioned patent to normally return the emptied pan to the uppermost position to receive the next bale.

What is claimed is:

1. The combination with a scale, of a pedestal, a rod slidably mounted within the pedestal, a spring for holding the rod elevated, a load receiving pan mounted upon the upper end of said rod, said pan and rod being capable of rotary movement, and co-acting means carried by the pedestal and pan for holding the pan against downward movement during the reception of a load, said holding means being made inoperative when the pan is rotated to weigh the load.

2. The combination with a scale, of a cylindrical pedestal, a slidably mounted and rotatable post disposed within the pedestal, a spring holding the post elevated, a load receiving pan mounted upon the upper end of said post, and coöperable means carried upon the under side of the pan and the upper end of the pedestal for holding the pan against lowering during receipt of a load, the rotation of the pan rendering the holding means inoperative to permit the load to depress the pan and the spring.

3. The combination with a scale, of a cylindrical pedestal, a slidably mounted and rotatable post disposed within the pedestal, a spring for holding the post elevated, a load receiving pan mounted upon the upper end of said post, a plurality of cam tracks disposed upon the upper end of the pedestal, and a plurality of anti-frictional supporting rollers for the pan disposed for coactive relation with the cam tracks, said rollers and cam tracks retaining the pan and post against depression during the reception of a load, the rotation of the pan and post rendering the rollers and tracks inoperative and permitting the load to depress the pan against the spring.

In testimony that I claim the foregoing as my own, I have hereto affixed my signature in the presence of two witnesses.

ORIN L. GORDON.

Witnesses:
MAUDE GALE,
SAVILLA SHIPMAN.

---

Copies of this patent may be obtained for five cents each, by addressing the "Commissioner of Patents, Washington, D. C."